June 3, 1969          A. PITNER          3,447,848
JOURNAL ROLLING BEARING HAVING A BUILT-IN SEALING ELEMENT
Filed June 21, 1966
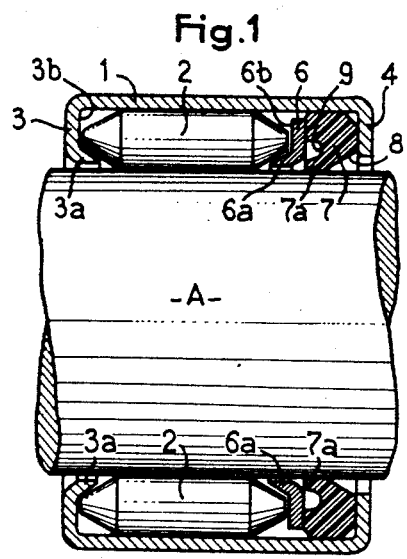
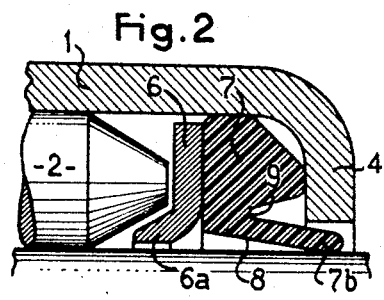
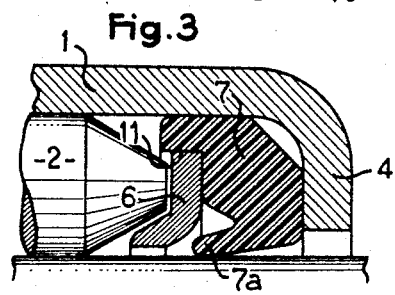
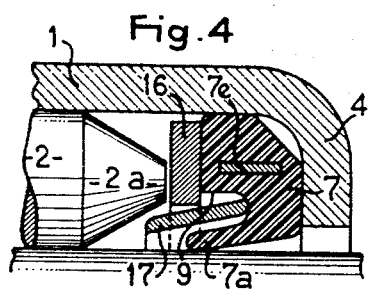
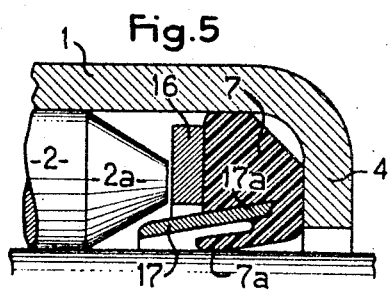

United States Patent Office 3,447,848
Patented June 3, 1969

3,447,848
JOURNAL ROLLING BEARING HAVING A
BUILT-IN SEALING ELEMENT
Alfred Pitner, Paris, France, assignor to
Nadella S.A., a French body corporate
Filed June 21, 1966, Ser. No. 559,216
Claims priority, application France, June 24, 1965,
22,074
Int. Cl. F16c 33/78; F16j 15/32
U.S. Cl. 308—187.2                                     12 Claims

ABSTRACT OF THE DISCLOSURE

Needle bearing comprising a thin-hardened outer ring with a radial shoulder at each end, means for retaining the needles, a plane washer adjacent one end of the needles for axially guiding the needles, the periphery of the washer defining with the outer ring an annular space and an annular flexible sealing element located between the washer and one of the shoulders of the ring and terminating axially short of the annular space, the sealing element being capable of being inserted in the ring by bending the middle plane or mean circumference thereof.

---

The present invention relates to journal needle bearings comprising a hardened thin ring, inner annular sealing means inside the ring and means for radially retaining the needles, the axial retainment of the needles being ensured by the radial shoulders formed on the ends of the thin ring.

When a cage is employed for containing the needles, it is a known practice to start with a non-hardened ring having a radial shoulder at one end and being open at the other end, insert the cage through the open cylindrical end of the ring and then close this end, that is, form the second radial shoulder and subject both the ring and the cage to the same hardening heat treatment. This procedure presents no difficulty. Unfortunately, it is impossible to incorporate an annular sealing element in following the same procedure since this element would be destroyed during the heat treatment.

It is of course possible, if a flexible and deformable annular sealing element is employed, to introduce the latter after the ring has been closed and after the heat treatment, but the rolling bearing thus constructed has the drawback of comprising a sealing element which does not resist very well the rubbing resulting from the contact of the edge of the cage. It is therefore preferable to incorporate a rigid sealing element or ring in the rolling bearing.

However, a rigid sealing element must be inserted after the heat treatment of the ring which is carried out when the ring is open at one end so as to permit the insertion of the sealing element. As it is practically impossible to close this end in the hardened state, it is necessary to employ various processes which avoid the hardening, or annul the hardening of this part.

The problem is therefore to construct a ring with a built-in sealing element in avoiding the aforementioned difficulties as concerns the forming of the second radial shoulder after the heat treatment of the ring.

To solve this problem, the invention provides a needle bearing comprising a washer having at least one plane hard radial face for axially guiding the needles and, located between said washer and an adjacent shoulder of the ring, an annular sealing element of flexible material known per se and adapted to be inserted in the ring by bending the middle plane or mean circumference of the sealing element.

In selecting for the washer a material having characteristics similar to those of the ring, for example mild steel, it is possible, in starting with a non-hardened ring open at one end and provided with a radial shoulder at the other end, to insert the washer through the open cylindrical end and then close this end, that is, form the second radial shoulder and subject to the same hardening heat treatment the ring and the washer it contains. In the case where a cage is employed for radially and axially retaining the needles, this common treatment could also be applied to the cage which would be previously introduced at the same time as the washer.

When the bearing is of the type having contacting needles the washer can be provided, on the edge thereof opposed to the race, with a flange for radially retaining the needles, the latter being further retained by an axial flange normally provided on the radial shoulder of the ring formed at the end of the ring opposed to that through which the washer is inserted.

According to another embodiment of the rolling bearing according to the invention, the washer is plane and thin so that it can be inserted in the ring by bending it in its mean plane so that the ring can be constructed directly with its two radial shoulders. In this case, the needles are retained radially at one end by an axial flange on the corresponding radial shoulder and at the other end by a cylindrical or slightly conical sleeve whose thickness is such that it can be inserted by deforming its mean circumference, this sleeve being retained axially between the washer and the sealing element.

According to the invention, it is also possible to retain the needles radially by means of segments of a cage capable of being placed in position, if desired with an elastic deformation thereof, inside a ring which is already provided with its two radial shoulders, the shoulder opposed to the sealing element comprising an axial flange for retaining the segments of the cage.

Further features and advantages of the invention will be apparent from the ensuing description with reference to the accompanying drawings to which the invention is in no way limited.

In the drawings:

FIG. 1 is an axial sectional view of one embodiment of the journal rolling bearing according to the invention;

FIGS. 2 and 3 are partial views of variants of the bearing shown in FIG. 1;

FIGS. 4 and 5 are partial views of two variants of another embodiment of the bearing according to the invention;

Figure 6:
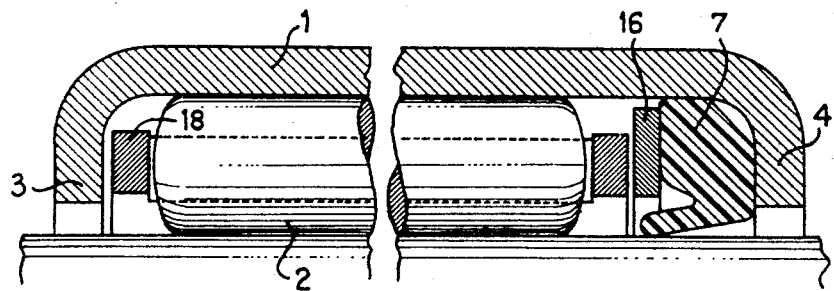
FIG. 6 is a partial view of an embodiment in which the needles are retained in a cage in one piece.

In the embodiment shown in FIG. 1, the rolling bearing according to the invention comprises a hardened thin ring 1 in which is retained a ring of contacting needles 2. The ring 1 is provided with two radial shoulders 3 and 4, the shoulder 3 being extended by an axial flange 3a which radially retains the needles 2 when the bearing is handled or stored before it is mounted. For radially retaining the needles there is also provided an axial flange 6a formed on a washer 6 comprising a plane and hard radial face 6a which guides, in cooperation with the inner radial face 3b of this shoulder 3, the needles in the axial direction. Inserted between the washer 6 and the shoulder 4 of the ring 1, is a flexible annular sealing element 7 composed of an elastomer or a plastics material. The element has sufficient flexibility to be inserted in the ring by an elastic deformation of its mean plane or of its mean circumference and is provided with a lip 7a which is oriented towards the interior of the bearing so as to, for example, retain in the best manner the lubricant by contact with the shaft A on which the bearing is mounted. The lip 7a is defined, for example, on the side thereof adjacent the shoulder 4 by a frustoconical face 8 and on the side thereof against the washer 6 by a groove 9.

The embodiment shown in FIG. 2 differs from the bearing shown in FIG. 1 only in respect of the orientation of the lip 7b of the sealing element 7, towards the exterior, the frustoconical surface 8 and the groove 9 being respectively adjacent the washer 6 and the radial shoulder 4. This arrangement affords maximum protection against introduction of foreign bodies.

In the embodiment shown in FIG. 3, the washer 6 is centered in a recess 11 in the sealing element 7 which comprises, as shown in FIG. 1, a lip 7a oriented towards the interior of the bearing.

In the embodiment shown in FIG. 4, the washer 16 is plane and this renders it deformable by bending in its mean plane. In the absence of an axial flange, the needles are radially retained by a frustoconical sleeve 17 whose large and small peripheries are disposed respectively inside the groove 9 of the sealing element 7 and in the region of the adjacent tapered portion 2a of the ends of the needles 2. This sleeve can be placed in position by deforming its mean circumference. Further, the sealing element 7 is reinforced by a light or small reinforcement 7e which allows the sealing element sufficient flexibility to enable it to be inserted in the ring by an elastic deformation of its mean circumference.

FIG. 5 shows the frustoconical sleeve 17 inserted at 17a in the sealing element 7 so as to perform the auxiliary function of a reinforcement for the element 7 in the same way as the reinforcement 7a shown in FIG. 4, the assembly consisting of the element 7 and sleeve 17 being inserted in the ring 1 by bending.

The bearing shown in FIG. 6 comprises, as those shown in FIGS. 4 and 5, a flat bearing washer 16 but the latter guides the needles 2 not directly by contact with the ends thereof, but through a cage in one piece 18 which comprises in the known manner means for radially retaining the needles. This arrangement permits constructing the ring 1 with only radial shoulders 3 and 4.

Figure 7:
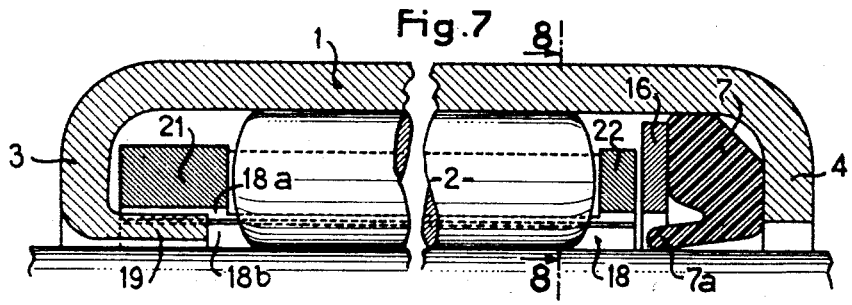
FIG. 7 is a partial axial sectional view of an embodiment in which the needles are retained in a segmented cage.
Figure 8:
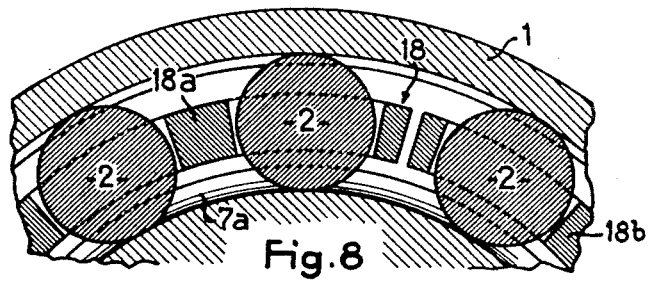
FIG. 8 is a sectional view taken along line 8—8 of FIG. 7.

The bearing shown in FIGS. 7 and 8 comprises a cage 18 consisting of a plurality of segments such as 18a, 18b which are radially retained by a cylindrical flange 19 formed on the radial shoulder 3. For this purpose the flange 19 extends in the region of a marginal portion 21 of the cage 18, the axial extent of this portion 21 being distinctly greater than that of a portion 22 which cooperates by its end face with the washer 16. The number of segments, such as 18a, 18b, is either sufficiently large to permit assembly without deformation despite the presence of the shoulders 4, 3 and the cylindrical flange 19, or there are two segments in which case the segments can be placed in position by elastically deforming them. As can be seen in FIG. 8, the apertures of the segments 18a, 18b have such shape and dimensions as to radially retain the needles 2.

Although specific embodiments of the invention have been described, many modifications and changes may be made therein without departing from the scope of the invention as defined in the appended claims.

Thus, an assembly comprising a washer and an annular sealing element can be provided adjacent each end of the ring 1. Similarly, in the case of a bearing having a segmented cage, the two marginal portions 21, 22 could have the same axial extent, the segments being retained, at one end by the cylindrical flange of the shoulder 3 and, at the other end, by means which have already been described in respect of bearings without a cage.

Having now described my invention what I claim as new and desire to secure by Letters Patent is:

1. In a needle bearing comprising a thin drawn sheet metal outer ring which encompasses needles and defines an inner bore and has an integral inwardly facing radial shoulder at each end thereof defining an aperture smaller than said bore, the ring and shoulders being in one piece and in a similarly heat-treated hardened condition, a plane washer adjacent one end of the needles and having at least one plane hard radial face adjacent the needles for axially guiding the needles, and an annular elastomer flexible sealing element located only between said washer and the adjacent one of said shoulders of the ring and of larger size than the aperture defined by said one of said shoulders, the improvement that said washer has an outside diameter less than the diameter of said bore and defines an annular space with said bore and said sealing element is merely in contact with but unattached to said washer and terminates axially short of said annular space and is deformable to such extent as to be capable of passing through said aperture defined by said one of said shoulders substantially without damage to the sealing qualities of said element, whereby said sealing element can be mounted in said ring subsequent to the hardening of said ring and shoulders.

2. In a needle bearing comprising a thin drawn sheet metal outer ring which encompasses needles and defines an inner bore and has an integral inwardly facing radial shoulder at each end thereof defining an aperture smaller than said bore, the ring and shoulders being in one piece and in a similarly heat-treated hardened condition, a plane washer adjacent one end of the needles and having at least one plane hard radial face adjacent the needles for axially guiding the needles, and an annular non-metallic flexible sealing element located only between said washer and the adjacent one of said shoulders of the ring and of larger size than the aperture defined by said one of said shoulders, the improvement that said washer has an outside diameter less than the diameter of said bore and defines an annular space with said bore and said sealing element is merely in contact with but unattached to said washer and terminates axially short of said annular space and is deformable to such extent as to be capable of passing through said aperture defined by said one of said shoulders substantially without damage to the sealing qualities of said element, whereby said sealing element can be mounted in said ring subsequent to the hardening of said ring and shoulders.

3. A bearing as claimed in claim 1, wherein the washer is of a material having characteristics similar to those of the ring so that it is possible to subject it to the same heat treatment as the ring, whereby the washer can be inserted in the open cylindrical end of the ring before closing this end and before heat treating the ring.

4. A bearing as claimed in claim 1, wherein the washer is thin so that it can be inserted in the ring, after said shoulders have been formed on the ring, by bending the mean plane of said washer.

5. A bearing as claimed in claim 1, wherein the washer comprises on the edge thereof opposed to the edge thereof adjacent the inner face of the ring an axially extending flange radially retaining the needles.

6. A bearing as claimed in claim 1, wherein the sealing element comprises a light reinforcement which permits the insertion of the sealing element by bending the mean circumference thereof.

7. A bearing as claimed in claim 4, wherein the needles are radially retained by an axially extending sleeve the thickness of which is such that it can be inserted by deforming its mean circumference, the sleeve being axially retained between the washer and the sealing element.

8. A bearing as claimed in claim 7, wherein the sleeve is inserted in the sealing element in such manner as to perform the function of a light reinforcement for the sealing element which permits its insertion by a bending of its mean circumference.

9. A bearing as claimed in claim 1, further comprising a cage in one piece which radially retains the needles.

10. A bearing as claimed in claim 1, further comprising a cage consisting of segments which are capable of being placed in position in the thin ring after the ring has already been provided with said two radial shoulders.

11. A bearing as claimed in claim 10, comprising an axially extending flange on the radial shoulder of the ring which is opposed to the shoulder adjacent to the sealing element, said flange radially retaining said segments.

12. A bearing as claimed in claim 1, wherein the sealing element comprises at least one axially extending inner annular lip for contacting a machine part on which the bearing is mounted.

References Cited

UNITED STATES PATENTS

| | | | |
|---|---|---|---|
| 3,003,835 | 10/1961 | Schindel | 308—187.2 |
| 3,189,359 | 6/1965 | Haberkorn | 277—205 |
| 3,206,829 | 9/1965 | Schaeffler | 308—187.1 |
| 3,226,168 | 12/1965 | Recknagel | 308—187.1 |
| 3,348,889 | 10/1967 | Schaeffler | 308—187.2 |
| 2,038,475 | 4/1936 | Brown | 308—216 X |
| 2,141,264 | 12/1938 | Cutting. | |
| 2,338,169 | 1/1944 | Dunn. | |
| 2,383,727 | 8/1945 | Lewis | 308—213 |
| 3,050,351 | 8/1962 | Kempf | 308—174 |
| 3,167,363 | 1/1965 | Murphy | 308—174 |

FOREIGN PATENTS

| | | |
|---|---|---|
| 483,182 | 7/1953 | Italy. |
| 458,243 | 12/1936 | Great Britain. |
| 833,154 | 4/1960 | Great Britain. |

OTHER REFERENCES

German printed application 1,075,383, February 1960.
German printed application 1,162,646, February 1964.

MARTIN P. SCHWADRON, *Primary Examiner.*
LUCIOUS L. JOHNSON, *Assistant Examiner.*

U.S. Cl. X.R.
277—188

UNITED STATES PATENT OFFICE
CERTIFICATE OF CORRECTION

Patent No. 3,447,848    Dated June 3, 1969

Inventor(s) Alfred Pitner

It is certified that error appears in the above-identified patent and that said Letters Patent are hereby corrected as shown below:

In the heading, column 1, line 4, --of one-half interest-- should be inserted after "assignor"; line 5, after "Nadella S.A.," insert -- Rueill-Malmaison, France,--.

SIGNED AND
SEALED
OCT 27 1970

(SEAL)
Attest:

Edward M. Fletcher, Jr.
Attesting Officer

WILLIAM E. SCHUYLER, JR.
Commissioner of Patents